(12) United States Patent
Nagata

(10) Patent No.: US 10,191,645 B2
(45) Date of Patent: Jan. 29, 2019

(54) CONTROLLING A TOUCH PANEL DISPLAY DURING SCROLLING OPERATIONS

(71) Applicant: KYOCERA Corporation, Kyoto-shi, Kyoto (JP)

(72) Inventor: Shunsuke Nagata, Higashiosaka (JP)

(73) Assignee: KYOCERA Corporation, Kyoto (JP)

( * ) Notice: Subject to any disclaimer, the term of this patent is extended or adjusted under 35 U.S.C. 154(b) by 303 days.

(21) Appl. No.: 15/055,462

(22) Filed: Feb. 26, 2016

(65) Prior Publication Data
US 2016/0179322 A1    Jun. 23, 2016

Related U.S. Application Data

(63) Continuation of application No. PCT/JP2014/072404, filed on Aug. 27, 2014.

(30) Foreign Application Priority Data

Aug. 28, 2013    (JP) .................... 2013-176858

(51) Int. Cl.
G06F 3/0485    (2013.01)
G06F 3/0488    (2013.01)
G06F 3/0481    (2013.01)

(52) U.S. Cl.
CPC ........ G06F 3/0485 (2013.01); G06F 3/04817 (2013.01); G06F 3/04883 (2013.01)

(58) Field of Classification Search
CPC ............... G06F 3/04883; G06F 3/0485; G06F 2203/04808; G06F 3/04817
See application file for complete search history.

(56) References Cited

U.S. PATENT DOCUMENTS

| 2003/0038846 A1* | 2/2003 | Hori ..................... G06F 9/4446 715/809 |
| 2010/0275150 A1 | 10/2010 | Chiba et al. |
| 2012/0041633 A1* | 2/2012 | Schunder ............... B60K 35/00 701/29.2 |

(Continued)

FOREIGN PATENT DOCUMENTS

| JP | 2000-89890 A | 3/2000 |
| JP | 2010-250379 A | 11/2010 |

(Continued)

OTHER PUBLICATIONS

International Search Report and Written Opinion of the International Searching Authority issued by the Japanese Patent Office for International Application No. PCT/JP2014/072404.

*Primary Examiner* — Jennifer N To
*Assistant Examiner* — Amy P Hoang
(74) *Attorney, Agent, or Firm* — Procopio Cory Hargreaves and Savitch LLP

(57) ABSTRACT

A mobile phone includes a display, a touch detector configured to detect an operation at least including a flick operation and a tap operation, and a processor configured to execute the control program to execute processing in accordance with the operation. The processor can cause a screen displayed on the display to be scrolled based on the flick operation on a display region R included in the display. If the screen includes an object to be subjected to the tap operation and while the screen is being scrolled, the processor can disable the tap operation on the object.

6 Claims, 10 Drawing Sheets

(56) References Cited

U.S. PATENT DOCUMENTS

| | | | | |
|---|---|---|---|---|
| 2012/0044170 A1* | 2/2012 | Homma | ................ | G06F 3/0488 |
| | | | | 345/173 |
| 2012/0278742 A1* | 11/2012 | Takami | ................ | G06Q 30/02 |
| | | | | 715/760 |
| 2014/0298251 A1* | 10/2014 | Ohtsuka | ................ | G06F 3/0485 |
| | | | | 715/784 |

FOREIGN PATENT DOCUMENTS

| JP | 2013-117858 A | 6/2013 |
|---|---|---|
| WO | 2009/044770 A | 4/2009 |

\* cited by examiner

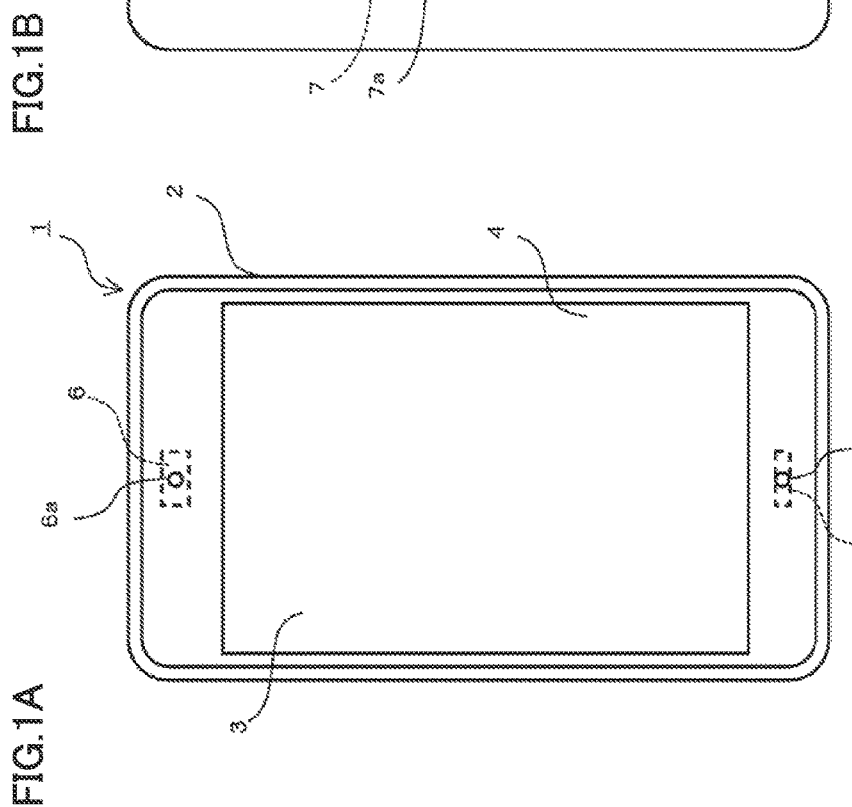
FIG.1A
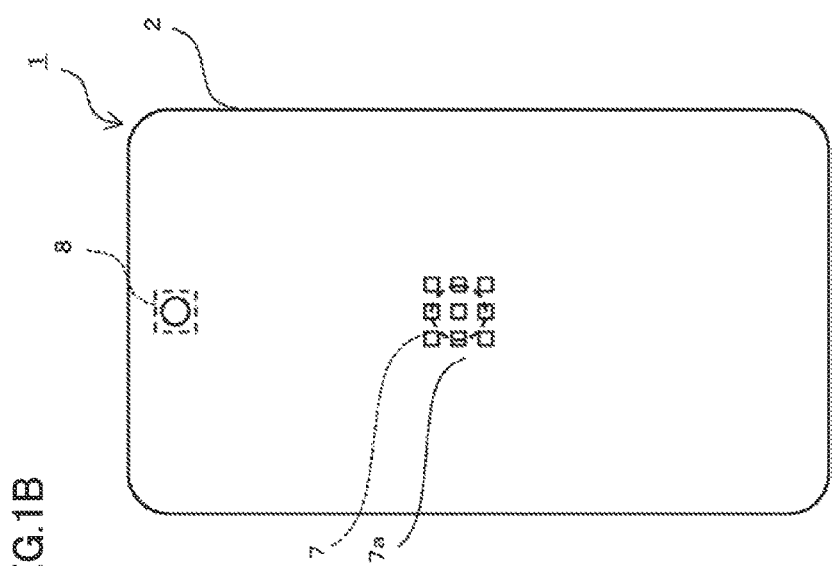
FIG.1B
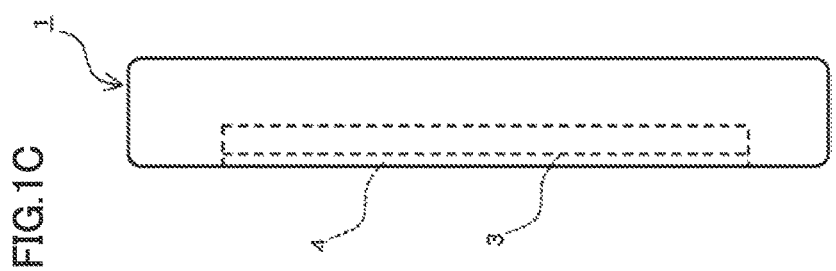
FIG.1C
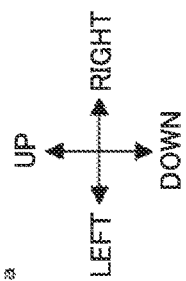
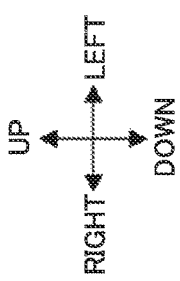
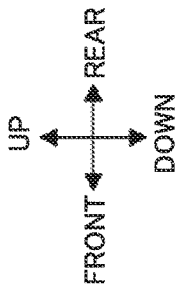

CONTROLLING A TOUCH PANEL DISPLAY DURING SCROLLING OPERATIONS

CROSS-REFERENCE TO RELATED APPLICATION

The present application is a continuation based on PCT Application No. PCT/JP2014/072404 filed on Aug. 27, 2014, which claims the benefit of Japanese Application No. 2013-176858, filed on Aug. 28, 2013. PCT Application No. PCT/JP2014/072404 is entitled "Electronic Equipment and Electronic Equipment Control Method", and Japanese Application No. 2013-176858 is entitled "Electronic Equipment, Control Method for Electronic Equipment and Program." The content of which are incorporated by reference herein in their entirety.

FIELD

The present disclosure relates to an electronic device, such as a mobile phone, a personal computer, a PDA (Personal Digital Assistant), a tablet PC, a music player, a navigation system, or a digital book terminal, particularly to an electronic device that executes various types of processing based on operations on a display unit. The present disclosure also relates to a control method suitable for use in such an electronic device.

BACKGROUND

A conventionally known mobile phone has a touch panel located on a display and executes various types of processing based on touch operations on the display. The touch operations include a flick operation, a tap operation, a sliding operation, and the like.

In this mobile phone, when a screen displayed on the display does not fit in a display region of the display, the entire screen can be displayed in the display region by scrolling of the screen.

SUMMARY

An electronic device according to an aspect includes a display, a detector configured to detect an operation at least including a flick operation and a tap operation, a storage unit configured to store a control program, and at least one processor configured to execute the control program to execute processing in accordance with the operation. The at least one processor can cause a screen displayed on the display to be scrolled based on the flick operation on a display region included in the display. If the screen includes an object to be subjected to the tap operation during a scroll of the screen, the at least one processor can disable the tap operation on the object.

An aspect relates to a method for controlling an electronic device configured to execute processing in accordance with an operation at least including a flick operation and a tap operation. The method according to an aspect comprises causing a screen displayed on a display to be scrolled based on the flick operation on a display region included in the display, and if the screen includes an object to be subjected to the tap operation during a scroll of the screen, disabling the tap operation on the object.

BRIEF DESCRIPTION OF THE DRAWINGS

FIGS. 1A to 1C show a configuration of a mobile phone according to an embodiment.

DETAILED DESCRIPTION

Figure 2:
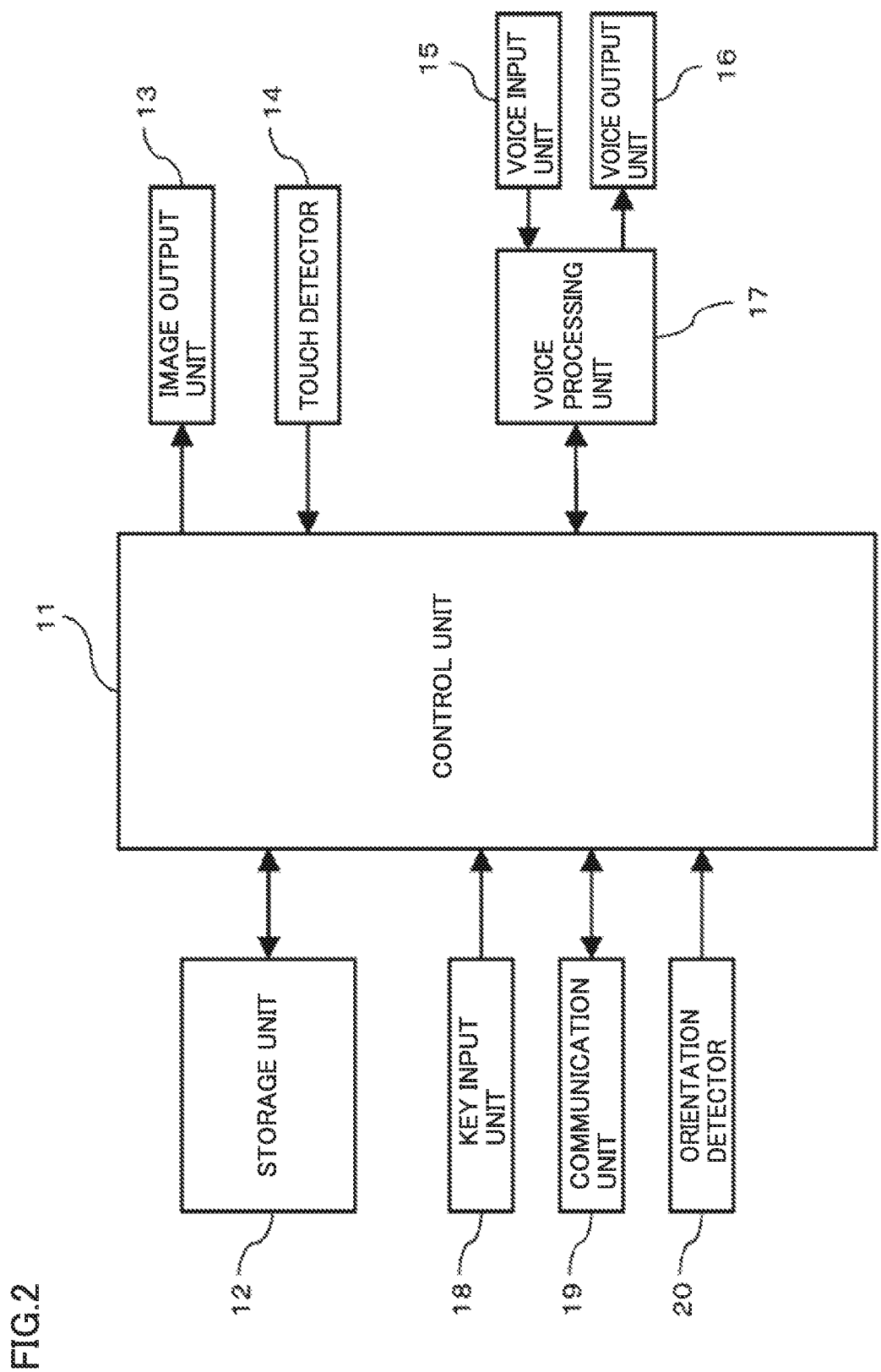
FIG. 2 is a block diagram showing an overall configuration of a mobile phone according to an embodiment.

Hereinafter, some embodiments will be described with reference to the drawings.

In a background art mobile phone, a flick operation is assigned, for example, as one of touch operations for scrolling. The flick operation is to flick or sweep a display with a finger or the like in a lateral direction, for example. When a user performs a flick operation on a screen to be scrolled, the screen is scrolled in the direction of the flick operation by an amount that depends on the strength (speed, length, etc.) of the flick operation. When there is no intended screen found, a user may perform flick operations quickly and successively. In such a situation, a subsequent flick operation is likely to be performed while scrolling is being performed by a flick operation.

If a user, thinking that he/she has performed a flick operation, releases his/her finger from the display without sufficient movement of his/her finger in the lateral direction, that is, if a flick operation is not established, the mobile phone receives the operation as a tap operation.

The screen may include an object (e.g., hyperlinked text or image, an icon for activating an application, etc.) to be subjected to a tap operation. While the screen is being scrolled, the position of the object is also moved with scrolling, which makes it difficult for a user to identify the position of the object, and a tap operation that a user does not intend to perform is likely to be performed on the object. If a tap operation that a user does not intend to perform is performed on the object, processing associated with that object is executed. In the case, a user may then be unable to scroll the screen smoothly to an intended position.

There may be a need for an electronic device that can suppress a touch operation that a user does not intend to perform.

FIGS. 1A to 1C show a front view, a rear view and a right side view of a mobile phone 1, respectively. Hereinafter, as shown in FIGS. 1A to 1C, the longitudinal direction of a cabinet 2 is defined as the up/down direction, and the shorter direction of cabinet 2 is defined as the left/right direction, for ease of description.

As shown in FIGS. 1A to 1C, mobile phone 1 may include cabinet 2, a display 3, a touch panel 4, a microphone 5, a conversation speaker 6, an external speaker 7, and a camera 8.

Cabinet 2 can have a substantially rectangular profile, for example, as seen from the front surface. Display 3 may be located on the front surface side of cabinet 2. Various types of images (screens) may be displayed on display 3. Display 3 is a liquid crystal display, for example. Display 3 may be a display of another type, such as an organic electroluminescence display. Touch panel 4 may be located to cover display 3. Touch panel 4 may be a transparent sheet. As touch panel 4, various types of touch panels, such as capacitance type, ultrasonic type, pressure-sensitive type, resistive film type, and optical sensing type touch panels, may be used. Display 3 may incorporate touch panel 4.

Microphone 5 may be located at the lower end within cabinet 2. Conversation speaker 6 may be located at the upper end within cabinet 2. Microphone 5 can receive voice passed through a microphone hole 5a formed in the front surface of cabinet 2. Microphone 5 can generate an electrical signal in accordance with received sound. Conversation speaker 6 can output sound. The output sound may be emitted out of cabinet 2 through an output hole 6a formed in the front surface of cabinet 2. At the time of a call, received voice from a device of a communication partner (mobile phone etc.) may be output through conversation speaker 6, and user's uttered voice may be input to microphone 5. The sound may include various types of sound, such as voice and an audible alert.

External speaker 7 may be located within cabinet 2. An output hole 7a may be in the rear surface of cabinet 2 in a region facing external speaker 7. Sound output through external speaker 7 may be emitted out of cabinet 2 through output hole 7a.

At the upper part of cabinet 2, a camera 8 may be located on the rear surface side. Camera 8 can include an imaging device, such as CCD or a CMOS sensor, and can pick up an image of a subject.

FIG. 2 is a block diagram showing an overall configuration of mobile phone 1. As shown in FIG. 2, mobile phone 1 includes a control unit 11, a storage unit 12, an image output unit 13, a touch detector 14, a voice input unit 15, a voice output unit 16, a voice processing unit 17, a key input unit 18, a communication unit 19, and an orientation detector 20.

Storage unit 12 may include ROM, RAM, and an external memory. Storage unit 12 includes various types of programs stored therein. The programs stored in storage unit 12 include various applications (e.g., home, telephone, e-mail, web browser, map, game, schedule management, etc.) in addition to a control program for controlling each unit of mobile phone 1. The programs stored in storage unit 12 may include programs for executing scroll processing, operation reception suppression processing, and display change processing which will be described later. The programs are stored in storage unit 12 by a manufacturer during manufacture of mobile phone 1, or may be stored in storage unit 12 through a communication network or storage medium, such as a memory card or CD-ROM.

Storage unit 12 may also include a working area for storing data temporarily utilized or generated while a program is executed.

Control unit 11 may include at least one processor such as CPU. When at least one processor executes the control program stored in storage unit 12, control unit 11 can control each unit of mobile phone 1 (storage unit 12, image output unit 13, touch detector 14, voice input unit 15, voice output unit 16, voice processing unit 17, key input unit 18, communication unit 19, orientation detector 20, and the like).

Image output unit 13 may include display 3 shown in FIGS. 1A and 1C. Image output unit 13 can cause display 3 to display an image (screen) based on a control signal and an image signal received from control unit 11. Image output unit 13 can turn on, turn off, and adjust brightness of, display 3 in response to control signals received from control unit 11.

Touch detector 14 can include touch panel 4 shown in FIGS. 1A and 1C, and can detect a touch operation on touch panel 4. More specifically, touch detector 14 can detect a position (hereinafter referred to as a "touch position") at which a contact object, such as a user's finger, contacts touch panel 4. Touch detector 14 can output a position signal generated based on a detected touch position to control unit 11 as a touch position.

When a user's finger has approached display 3, namely, touch panel 4, touch detector 14 is configured to detect a position where the user's finger has approached.

A user can perform various touch operations by touching touch panel 4 with his/her finger or bringing his/her finger closer thereto. The touch operation can include a tap operation, a flick operation, a sliding operation, and the like, for example. The tap operation is an operation that a user contacts touch panel 4 with his/her finger, and then lifts the finger from touch panel 4 after a short period of time. The flick operation is an operation that a user contacts touch panel 4 with his/her finger or brings his/her finger closer thereto, and then flicks or sweeps touch panel 4 with the finger in any direction. The sliding operation is an operation that a user moves his/her finger in any direction with the finger kept in contact with or in proximate to touch panel 4.

For example, in the case where touch detector 14 detects a touch position, when the touch position is no longer detected within a predetermined first time period after the touch position is detected, control unit 11 can determine that the touch operation is a tap operation. In the case where a touch position is moved by a predetermined first distance or more within a predetermined second time period after the touch position is detected, and then the touch position is no longer detected, control unit 11 can determine that the touch operation is a flick operation. When a touch position is moved by a predetermined second distance or more after the touch position is detected, control unit 11 can determine that the touch operation is a sliding operation.

Voice input unit 15 may include microphone 5. Voice input unit 15 can output an electrical signal from microphone 5 to voice processing unit 17.

Voice output unit 16 may include conversation speaker 6 and external speaker 7. An electrical signal received from voice processing unit 17 is input to voice output unit 16. Voice output unit 16 can cause sound to be output through conversation speaker 6 or external speaker 7.

Voice processing unit 17 can perform A/D conversion or the like on an electrical signal received from voice input unit 15, and can output a digital audio signal after conversion to control unit 11. Voice processing unit 17 can perform decoding and D/A conversion or the like on a digital audio signal received from control unit 11, and can output an electrical signal after conversion to voice output unit 16.

Key input unit 18 may include at least one or more hard keys. For example, key input unit 18 may include a power key for turning on mobile phone 1, and the like. Key input unit 18 can output a signal corresponding to a pressed hard key to control unit 11.

Communication unit 19 may include a circuit for converting a signal, an antenna that transmits/receives electric waves, and the like, in order to make calls and communications. Communication unit 19 can convert a signal for a call or communication received from control unit 11 into a radio signal, and can transmit the converted radio signal to a communication destination, such as a base station or another communication device, through the antenna. Communication unit 19 can convert a radio signal received through the antenna into a signal in the form that can be utilized by control unit 11, and can output the converted signal to control unit 11.

Orientation detector 20 may include a three-axis accelerometer or the like. The three-axis accelerometer can detect the gravitational acceleration that acts on mobile phone 1 in the front/rear, left/right and up/down directions. Orientation detector 20 can detect the orientation of mobile phone 1 based on the detection result of the three-axis accelerometer, and can output a detection signal in accordance with the detected orientation of mobile phone 1 to control unit 11. For example, when mobile phone 1 is laid on a desk, and thus kept in the horizontal state (in which display 3 faces in the vertical direction), orientation detector 20 can output a detection signal corresponding to the horizontal state. When mobile phone 1 is held by a user in a vertical orientation (such that the longitudinal direction of cabinet 2 is the vertical direction), orientation detector 20 can output a detection signal corresponding to the vertical orientation. When mobile phone 1 is held by a user in a lateral orientation (such that the longitudinal direction of cabinet 2 is the horizontal direction), orientation detector 20 can output a detection signal corresponding to the lateral orientation.

When each type of application is executed by control unit 11, an execution screen 101 thereof may be displayed on display 3.

Figure 3A:
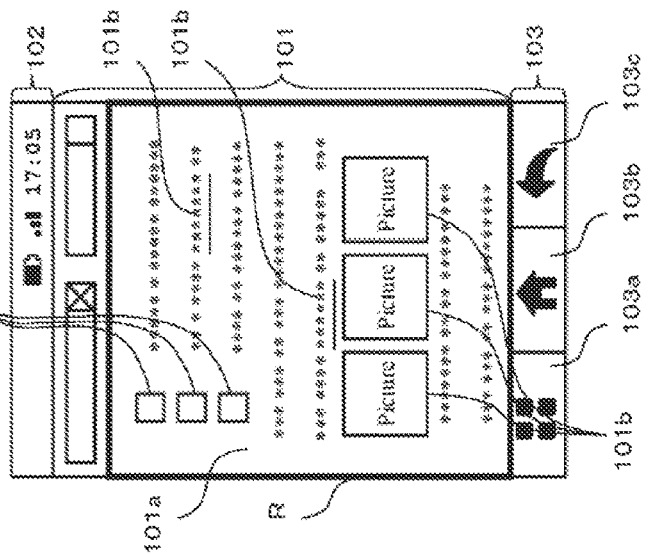
FIGS. 3A to 3C each show an example where a scrollable execution screen is displayed on a display, according to an embodiment.
Figure 3B:
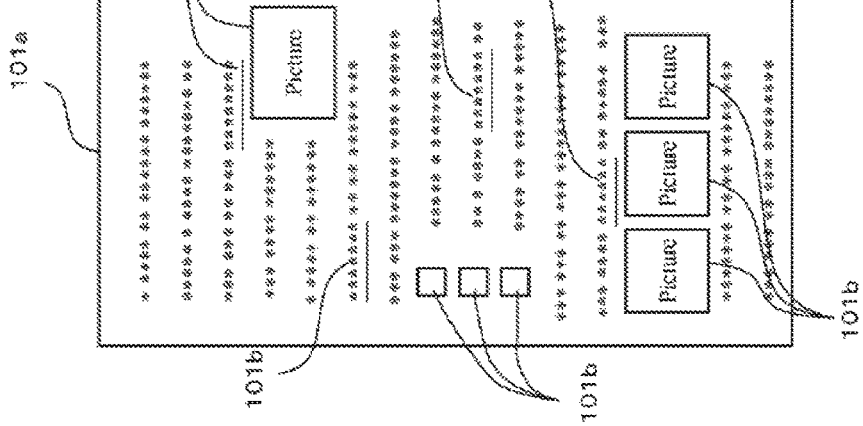
Figure 3C:
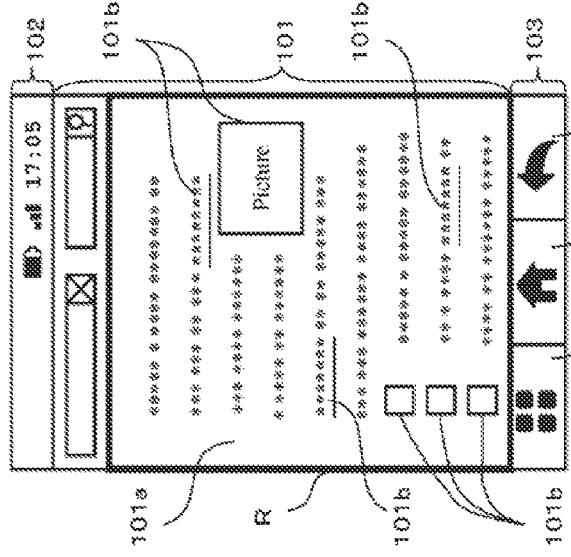

FIGS. 3A to 3C each show an example where scrollable execution screen 101 is displayed on display 3. In each of FIGS. 3A to 3C, a web screen is displayed on display 3 as an example of execution screen 101.

As shown in FIGS. 3A and 3B, when the overall size of a predetermined screen (e.g., web page) 101a included in execution screen (e.g., web screen) 101 is larger than the size of a display region R of display 3 assigned to screen 101a, a portion of screen 101a is displayed in display region R. In this case, control unit 11 sets screen 101a as a scroll target screen. When the size of scroll target screen 101a is larger than that of display region R with respect to the up/down direction of display 3, scroll target screen 101a is made scrollable in the up/down direction by a scroll operation. For ease of description, display region R is indicated by the bold frame in FIGS. 3A and 3C.

Control unit 11 may receive, as a scroll operation, a flick operation or a sliding operation on display region R in the up/down direction. When a flick operation or a sliding operation in the upward direction is performed, control unit 11 can cause scroll target screen 101a to move upward. As shown in FIG. 3C, a lower portion of scroll target screen 101a with respect to the portion displayed before the movement is displayed in display region R.

As shown in FIGS. 3A and 3C, a notification bar 102 and an operation key group 103 are displayed on display 3 simultaneously with execution screen 101. Notification bar 102 is displayed above execution screen 101. Notification bar 102 may include a current time, a capacity meter indicating the battery capacity, a strength meter indicating the strength of electric waves, and the like. Operation key group 103 is displayed under execution screen 101. Operation key group 103 may include a setting key 103a, a home key 103b and a back key 103c. Setting key 103a is a key mainly for causing display 3 to display a setting screen for performing various types of setting. Home key 103b is a key mainly for causing the display of display 3 to shift to a home screen from another screen. Back key 103c is a key mainly for returning executed processing to processing of an immediately preceding step.

Execution screen 101 as a whole may become scroll target screen 101a. At least one of notification bar 102 and operation key group 103 may not be displayed simultaneously with execution screen 101. If notification bar 102 is not displayed, execution screen 101 is extended upward, and when operation key group 103 is not displayed, execution screen 101 is extended downward. If neither notification bar 102 or operation key group 103 is displayed, execution screen 101 is displayed on entire display 3.

If a user performs a flick operation, scroll target screen 101a is scrolled in the direction of the flick operation by the amount that depends on the speed of the flick operation. If scroll target screen 101a is long, a user may perform flick operations successively in order to have an intended screen displayed. At this time, if a user, thinking that he/she has performed a flick operation, releases his/her finger from display 3 without sufficient movement of the finger in the lateral direction, control unit 11 receives the operation as a tap operation.

As shown in FIGS. 3A to 3C, scroll target screen 101a may include object 101b, such as hyperlinked text, image or figure to be subjected to a tap operation. If a flick operation is received as a tap operation without user's intention, and when the position at which the tap operation has been performed is the position of object 101b, processing for object 101b assigned to the tap operation will be executed against a user's will. If successive flick operations are performed, a subsequent flick operation is likely to be performed while scrolling is being performed by a flick operation. In this case, the position of object 101b is also moved in accordance with scrolling of the screen. This makes it difficult for a user to identify the position of object 101b, and an accidental tap operation is likely to be performed on object 101b.

In mobile phone 1 of an embodiment, control unit 11 may execute scroll processing, operation reception suppression processing and display change processing, which will be described below, in order to prevent an action different from scrolling of the screen that a user does not intend to perform from being performed by a user's accidental operation.

Figure 4:
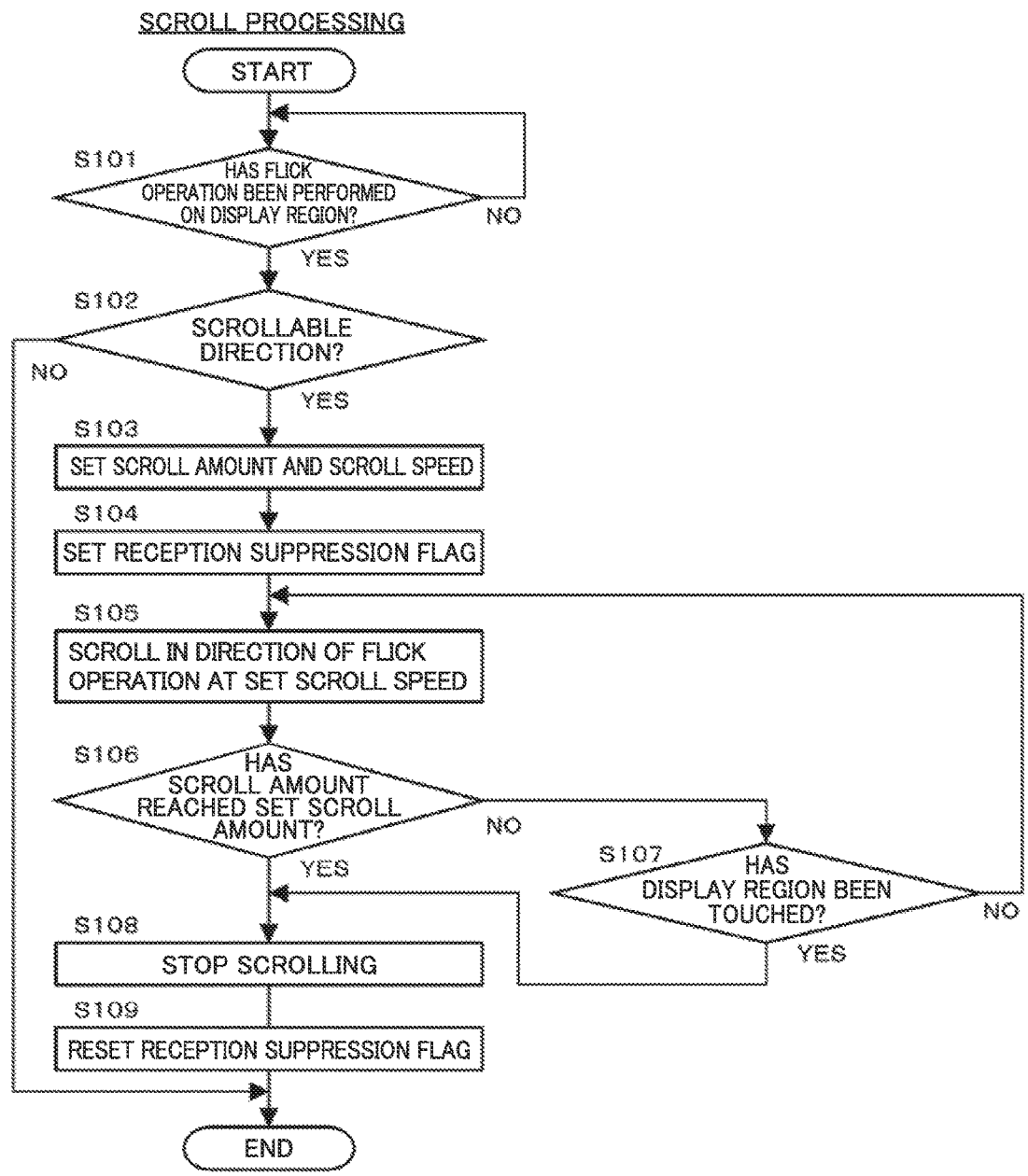
FIG. 4 is a flowchart showing scroll processing according to an embodiment for scrolling a scroll target screen based on a flick operation.

FIG. 4 is a flowchart showing scroll processing for scrolling scroll target screen 101a based on a flick operation.

When the scroll processing is started, control unit 11 monitors whether or not a flick operation has been performed on display region R in which scroll target screen 101a is displayed (S101). If a flick operation has been performed on display region R (YES in S101), and if the direction of the flick operation is a scrollable direction (the up/down direction in the example of FIGS. 3A to 3C) (YES in S102), control unit 11 can set a scroll amount and a scroll speed for scrolling scroll target screen 101a based on the speed of the flick operation (S103).

Storage unit 12 has stored therein a correspondence table indicating the relation of the speed of a flick operation (a value equivalent to the speed, for example, a distance that a touch position is moved within the second time period) with the scroll amount and the scroll speed. Control unit 11 can set the scroll amount and the scroll speed corresponding to the speed of a flick operation with reference to the correspondence table. As the speed of a flick operation is higher, the scroll amount is made larger and the scroll speed is made higher. Instead of the correspondence table, operational expressions for calculating the scroll amount and the scroll speed from the speed of a flick operation may be stored in storage unit 12.

When the scroll amount and the scroll speed are set, control unit 11 can set a reception suppression flag (S104). The reception suppression flag may be provided in storage unit 12, for example. The reception suppression flag indicates whether or not scroll target screen 101a is being scrolled. In the operation reception suppression processing which will be described later, control unit 11 can use the reception suppression flag for determining whether to enable or disable a touch operation on object 101b.

When the reception suppression flag is set, control unit 11 can cause scroll target screen 101a to be scrolled in the direction of a flick operation at the set scroll speed (S105). Control unit 11 may cause scrolling to be performed at the set scroll speed from the beginning, or may gradually increase the speed up to the set scroll speed.

Control unit 11 can determine whether or not the scroll amount has reached the set scroll amount (S106). If the scroll amount has not reached the set scroll amount (NO in S106), control unit 11 can determine whether or not display region R has been touched (S107).

When the scroll amount has reached the set scroll amount without display region R being touched (YES in S106), control unit 11 can stop the scrolling of scroll target screen 101a (S108), and can reset the reception suppression flag (S109). While scroll target screen 101a is being scrolled, the reception suppression flag is in the set state.

In the case of stopping scrolling, control unit 11 may cause the speed to be immediately dropped from the set scroll speed to zero, or may cause the speed to be gradually decelerated from the set scroll speed.

In the case of stopping scroll target screen 101a in the course of scrolling, a user touches display region R. When it is thereby determined that display region R has been touched before the scroll amount reaches the set scroll amount (YES in S107), control unit 11 can stop scrolling of scroll target screen 101a (S108), and can reset the reception suppression flag (S109). When the reception suppression flag is reset, the scroll processing is once terminated. After that, the scroll processing is resumed.

When flick operations are performed successively by a user, a subsequent flick operation may be performed on display region R during scrolling. In this case, it is determined in step S107 that display region R has been touched, and scrolling is once stopped. Immediately thereafter, it is determined in step S101 of subsequent scroll processing that a flick operation has been performed, and scrolling is started. It appears to the user that scrolling of scroll target screen 101a is about to be stopped once by a flick operation and then resumed.

After it is determined in step S107 that display region R has been touched, control unit 11 may be configured to further determine whether or not the touch has been made by a flick operation, and to stop scrolling if it has not been made by a flick operation. In this case, if the touch on display region R has been made by a flick operation, control unit 11 can set the scroll amount and the scroll speed based on the speed of the flick operation, and can continue scrolling without stopping even if the scroll amount based on a previous flick operation has been attained.

Control unit 11 can execute operation reception suppression processing for suppressing reception of a tap operation on scroll target screen 101a during scrolling, in parallel with the scroll processing.

Figure 5:
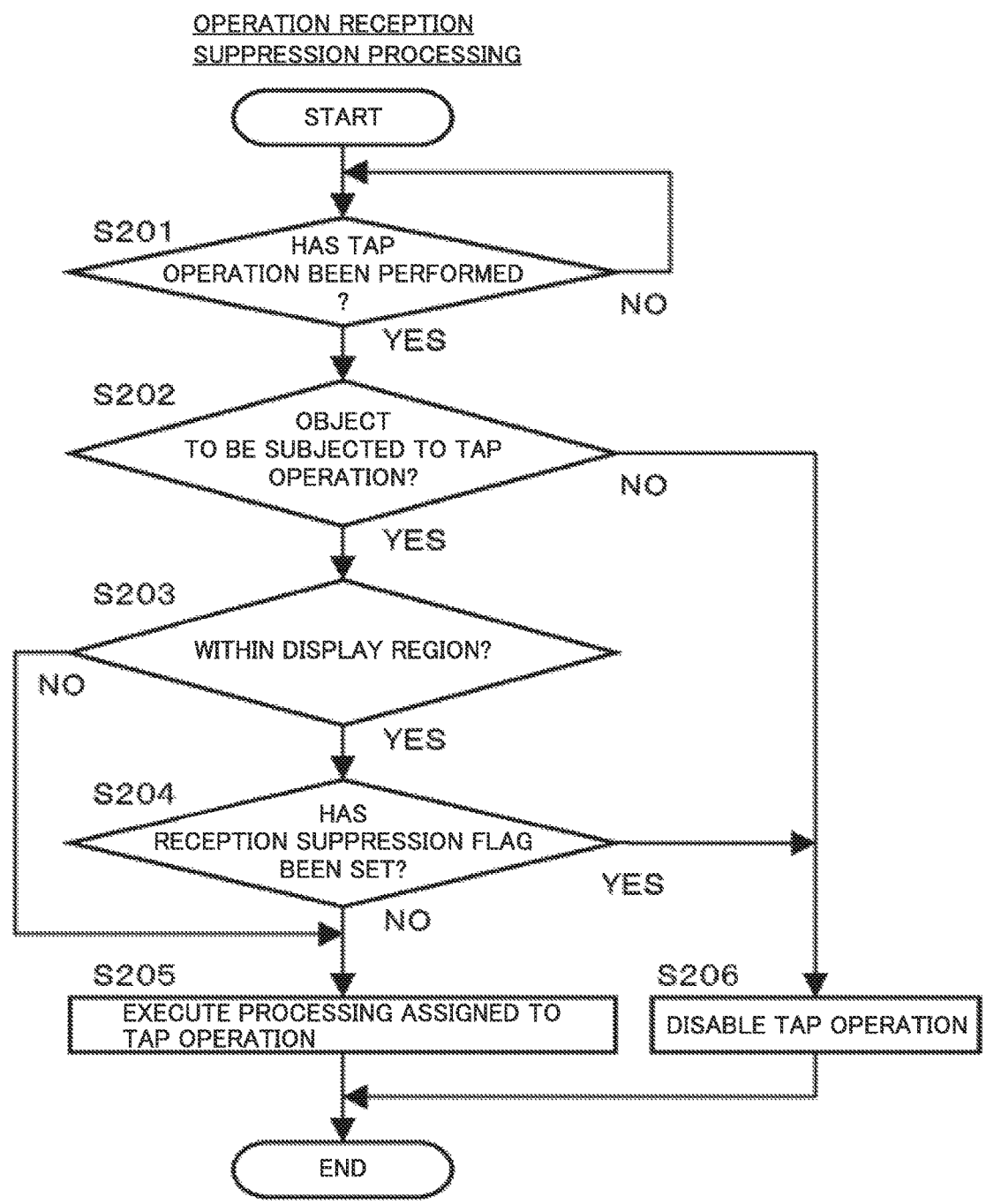
FIG. 5 is a flowchart showing operation reception suppression processing according to an embodiment.

FIG. 5 is a flowchart showing operation reception suppression processing.

When the operation reception suppression processing is started, control unit 11 can monitor whether or not a tap operation on display 3 has been performed (S201). If a tap operation has been performed on display 3 (YES in S201), and if the tap operation has been performed on object 101b to be subjected to a tap operation (YES in S202), control unit 11 can determine whether or not that object 101b is located within display region R (S203).

If object 101b is located within display region R (YES in S203), control unit 11 can determine whether or not the reception suppression flag has been set (S204). If the reception suppression flag has not been set (NO in S204), an accidental tap operation is less likely to occur since scroll target screen 101a displayed in display region R is not being scrolled. Control unit 11 can enable the tap operation on object 101b, and can execute processing for object 101b assigned to the tap operation (S205). As in the examples of FIGS. 3A to 3C, for example, if objects 101b are hyperlinked text and the like, a linked web page may be displayed in display region R.

If the reception suppression flag has been set (YES in S204), an accidental tap operation as described above that a user does not intend to perform is likely to occur since scroll target screen 101a displayed in display region R is being scrolled. Control unit 11 is configured to disable a tap operation on object 101b (S206), and not to execute processing for object 101b assigned to the tap operation.

If object 101b is not located in display region R (NO in S203), control unit 11 can enable a tap operation on object 101b, and can execute processing for object 101b assigned to the tap operation (S205).

Control unit 11 can execute display change processing for changing the display style of object 101b included in scroll target screen 101a depending on whether or not scroll target screen 101a is being scrolled, in parallel with the scroll processing and the operation reception suppression processing.

Figure 6:
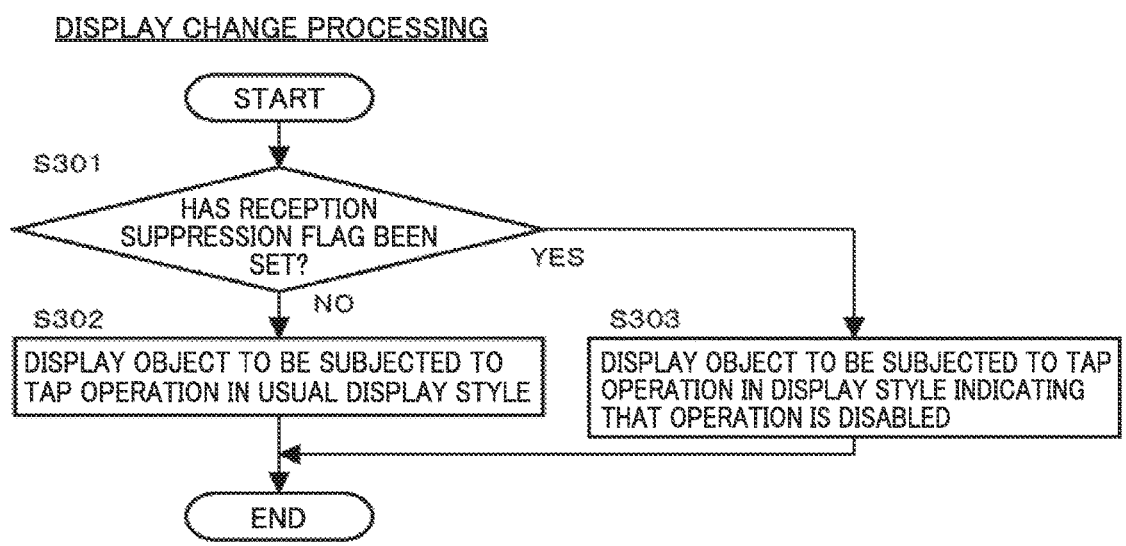
FIG. 6 is a flowchart showing display change processing according to an embodiment.

FIG. 6 is a flowchart showing display change processing.

When the display change processing is started, control unit 11 can determine whether or not the reception suppression flag has been set (S301). If the reception suppression flag has not been set (NO in S301), that is, if scroll target screen 101a is not being scrolled, control unit 11 can cause display object 101b displayed within display region R to be displayed in a usual display style (S302).

If the reception suppression flag has been set (YES in S301), that is, if scroll target screen 101a is being scrolled, control unit 11 can cause object 101b displayed within display region R to be displayed in a display style for indicating that a tap operation is disabled (S303). As in the examples of FIGS. 3A to 3C, for example, if objects 101b are hyperlinked text and the like, text may be displayed in a less visible manner than in the usual display. The text is grayed out, for example. If object 101b is a hyperlinked image, for example, the image is displayed in a darker color than in the usual display style. Hyperlinked text or image may be displayed in a color different from the usual display style.

According to an embodiment, if scroll target screen 101a is being scrolled, a tap operation on object 101b included in scroll target screen 101a may be disabled. Even if a flick operation performed in the course of scrolling accidentally results in a tap operation on the position of object 101*b*, processing for that object 101*b* will not be executed. Even if a tap operation is accidentally performed on object 101*b* although a user has intended to perform the tap operation on a position other than object 101*b* in order to suspend scrolling, processing for that object 101*b* will not be executed. It is possible to prevent scrolling from being interrupted long by an accidental operation, and a user can scroll smoothly scroll target screen 101*a*.

According to an embodiment, while scroll target screen 101*a* is being scrolled and while a tap operation on object 101*b* is disabled, object 101*b* may be displayed in a display style indicating that a tap operation is disabled. A user can identify that it is a state where a tap operation on object 101*b* is not received.

Although an embodiment of the present disclosure has been described above, the present disclosure is not at all restricted by the above-described embodiment or the like, and various modifications can also be made to the embodiment in addition to the above.

<First Variation>

If there are few objects 101*b* included in a scroll target screen, even if an accidental tap operation is performed during scrolling, the tap operation is less likely to be performed on any object 101*b*.

In a first variation, it may be determined whether or not a tap operation on object 101*b* during scrolling is disabled depending on the number of objects 101*b* included in a portion displayed in display region R on scroll target screen 101*a*.

Figure 7:
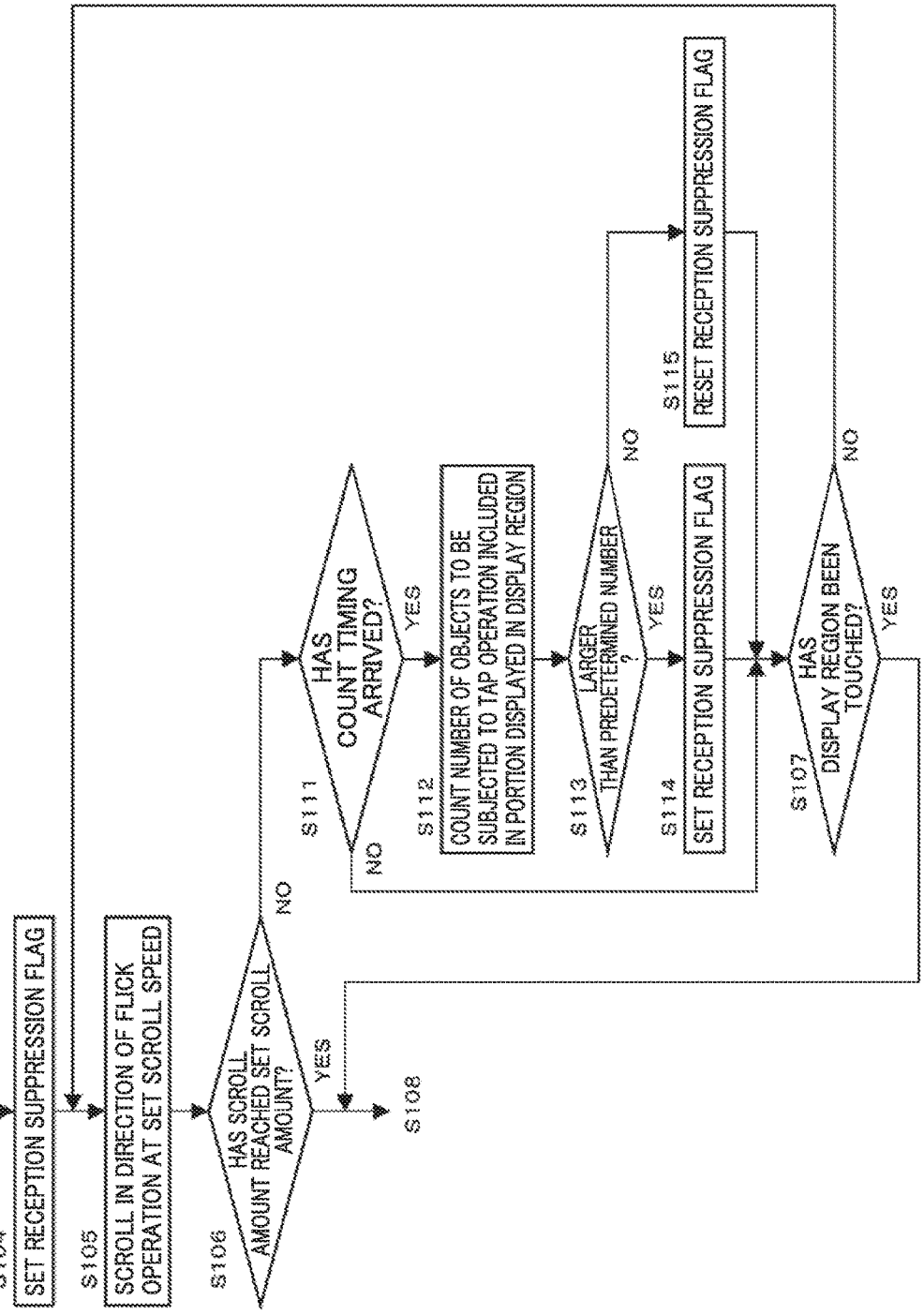
FIG. 7 is a flowchart showing scroll processing according to a first variation.

FIG. 7 is a flowchart showing scroll processing according to the first variation. In the first variation, steps S111 to S115 are added to the scroll processing shown in FIG. 4. For the sake of convenience, some steps identical to those of the scroll processing shown in FIG. 4 are not shown in FIG. 7.

After starting scrolling of scroll target screen 101*a*, when it is determined that the scroll amount has not reached the set scroll amount (NO in S106), control unit 11 can determine whether or not count timing has arrived (S111). For example, control unit 11 can be configured to determine that the count timing has arrived each time when scroll target screen 101*a* is scrolled by a predetermined amount.

When the count timing has arrived (YES in S111), control unit 11 can count the number of objects 101*b* included in the portion displayed in display region R on scroll target screen 101*a* (S112). If the counted number is larger than a predetermined number (YES in S113), control unit 11 can set the reception suppression flag (S114). If the reception suppression flag has already been set at this time, control unit 11 can maintain the set state. If the counted number is not larger than the predetermined number (NO in S113), control unit 11 can reset the reception suppression flag. If the reception suppression flag has already been reset at this time, control unit 11 can maintain the reset state.

In this way, steps S112 to S115 are repeated each time when the count timing arrives. If scroll target screen 101*a* is being scrolled, and while the number of objects 101*b* included in the portion displayed in display region R is larger than the predetermined number, so that an accidental tap operation is highly likely to be performed on object 101*b*, the reception suppression flag may be set. While the number of objects 101*b* is smaller than or equal to the predetermined number, so that an accidental tap operation is less likely to be performed on object 101*b*, the reception suppression flag may be reset.

When the operation reception suppression processing shown in FIG. 5 is executed, if scroll target screen 101*a* is being scrolled, so that an accidental tap operation is highly likely to be performed on object 101*b*, a tap operation on object 101*b* may be disabled. While an accidental tap operation is less likely to be performed on object 101*b* even if scroll target screen 101*a* is being scrolled, a tap operation on object 101*b* may be enabled.

According to the first variation, while an accidental tap operation is less likely to be performed on object 101*b* even if scroll target screen 101*a* is being scrolled, a user can perform a tap operation on desired object 101*b* to cause mobile phone 1 to execute processing assigned to the tap operation.

<Second Variation>

In a second variation, different from the above-described first variation, whether or not to disable a tap operation on object 101*b* during scrolling may be determined depending on the number of objects 101*b* included in entire scroll target screen 101*a*.

Figure 8:
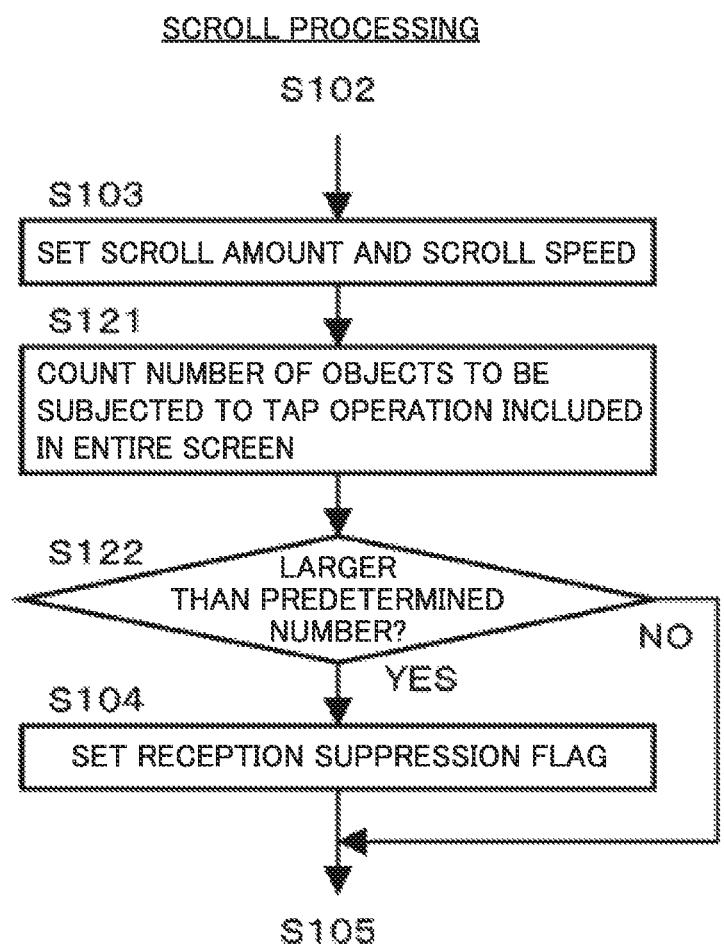
FIG. 8 is a flowchart showing scroll processing according to a second variation.

FIG. 8 is a flowchart showing scroll processing according to the second variation. In the second variation, steps S121 and S122 are added to the scroll processing shown in FIG. 4. For the sake of convenience, some steps identical to those of the scroll processing shown in FIG. 4 are not shown in FIG. 8.

In step S103, when the scroll amount and the scroll speed are set in accordance with the speed of a flick operation, control unit 11 can count the number of objects 101*b* included in entire scroll target screen 101*a* (S121). If the counted number is larger than a predetermined number (YES in S122), control unit 11 can set the reception suppression flag (S104). If the counted number is not larger than the predetermined number (NO in S122), control unit 11 can maintain the reset state without setting the reception suppression flag.

If the number of objects 101*b* is smaller than or equal to the predetermined number, so that an accidental tap operation is less likely to be performed on object 101*b*, the reception suppression flag is not set even if scroll target screen 101*a* is being scrolled. Even during scrolling, a tap operation on object 101*b* is enabled in the operation reception suppression processing shown in FIG. 5.

According to the second variation, similarly to the first variation, when an accidental tap operation is less likely to be performed on object 101*b* even if scroll target screen 101*a* is being scrolled, a user can perform a tap operation on desired object 101*b* to cause mobile phone 1 to execute processing assigned to the tap operation.

<Third Variation>

When performing flick operations successively for scrolling scroll target screen 101*a*, a user is likely to perform flick operations without carefully watching scroll target screen 101*a*. In this case, even if scrolling is at a stop, a flick operation may be accidentally received as a tap operation.

In a third variation, the scroll processing shown in FIG. 4 is modified to address an accidental tap operation after a stop of scrolling.

Figure 9:
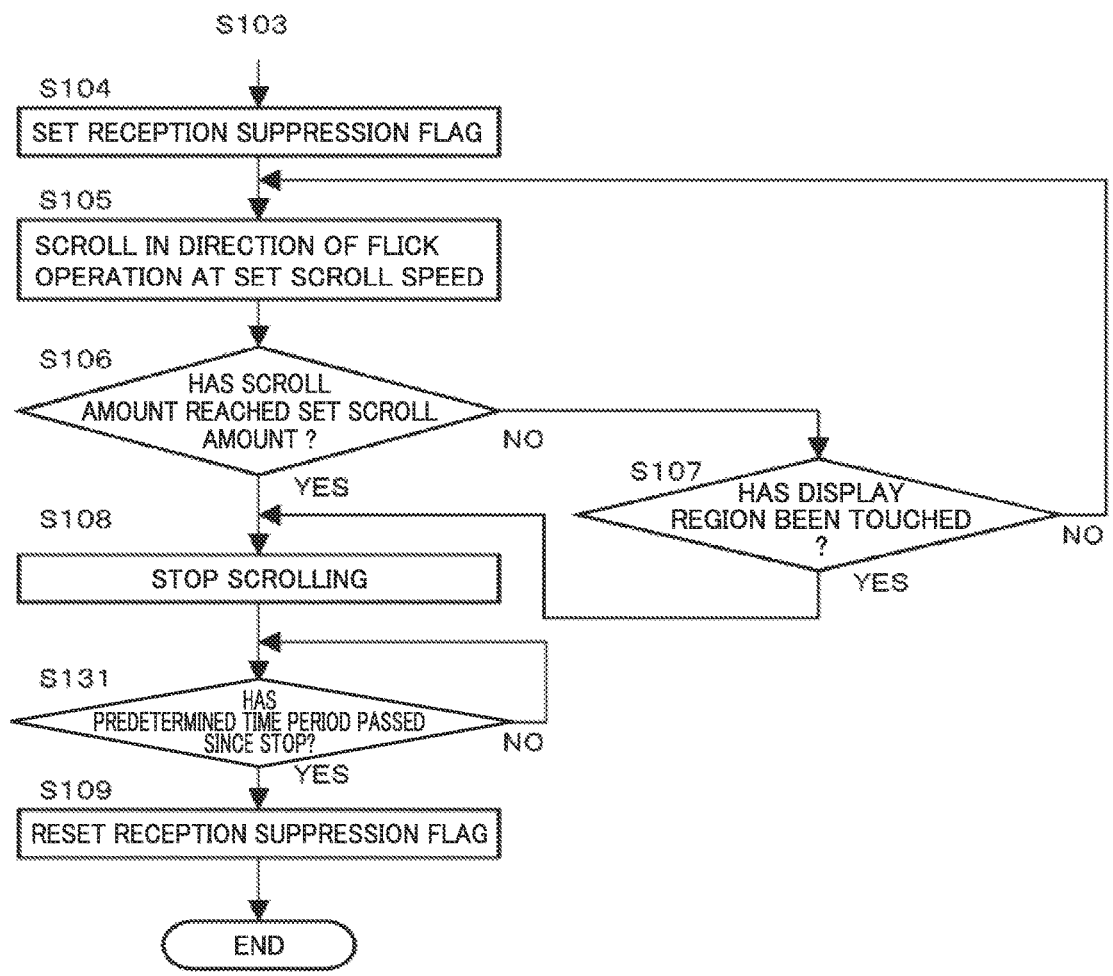
FIG. 9 is a flowchart showing scroll processing according to a third variation.

FIG. 9 is a flowchart showing scroll processing according to the third variation. In the third variation, step S131 is added to the scroll processing shown in FIG. 4. For the sake of convenience, some steps identical to those of the scroll processing shown in FIG. 4 are not shown in FIG. 9.

When control unit 11 stops scrolling of scroll target screen 101*a*, control unit 11 can count the time by a timer provided inside control unit 11, and can determine whether or not a predetermined time period has passed since the stop of scrolling (S131).

If a user performs a tap operation on intended object 101b after finishing scrolling of scroll target screen 101a, it takes a certain time period until a tap operation is performed after scrolling is stopped. The predetermined time period is set in advance in consideration of the time period from a stop of scrolling to a tap operation, assumed to be taken when a user intentionally performs a tap operation on object 101b.

When the predetermined time period has passed after scrolling is stopped (YES in S131), control unit 11 can reset the reception suppression flag (S109).

In this way, when the operation reception suppression processing shown in FIG. 5 is executed, a tap operation on object 101b may be disabled until the predetermined time period has passed even if scrolling is stopped.

According to the third variation, even if an accidental tap operation is performed after a stop of scrolling, processing based on the tap operation will not be executed, which allows a user to scroll more smoothly scroll target screen 101a.

The configuration of the third variation may be combined with that of the first or second variation described above.

<Another Variation>

In the above-described embodiment, when a user performs a predetermined operation on mobile phone 1, a tap operation on object 101b during scrolling may be disabled.

Figure 10:
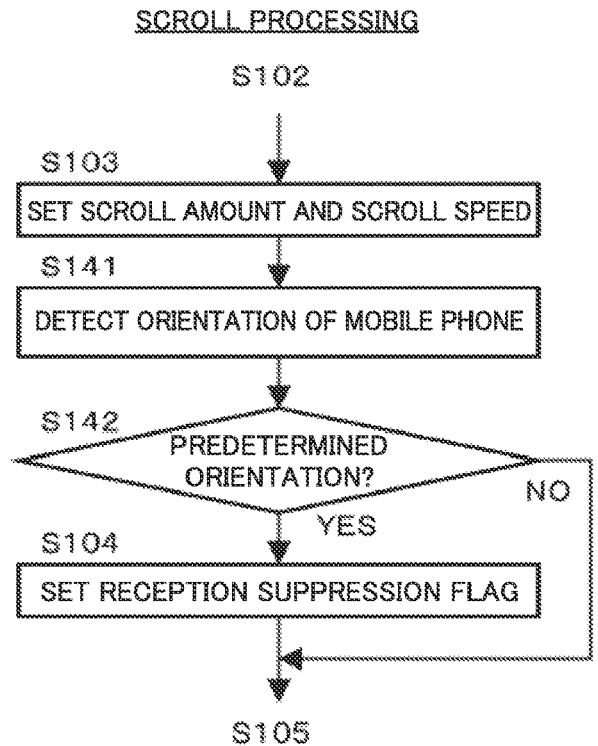
FIG. 10 is a flowchart showing scroll processing according to another variation when an action of holding a mobile phone in a predetermined orientation is set as a predetermined operation.

FIG. 10 is a flowchart showing scroll processing when an action of holding mobile phone 1 in a predetermined orientation is set as the predetermined operation. In this variation, steps S141 and S142 are added to the scroll processing shown in FIG. 4. For the sake of convenience, some steps identical to those of the scroll processing shown in FIG. 4 are not shown in FIG. 10.

In step S103, when the scroll amount and the scroll speed are set in accordance with the speed of a flick operation, control unit 11 can detect the orientation of mobile phone 1 (S141). Control unit 11 can determine whether or not the detected orientation of mobile phone 1 is the predetermined orientation, for example, the lateral orientation or the vertical orientation (S142).

If a user intends to suppress reception of a tap operation during scrolling, he/she can hold mobile phone 1 in the predetermined orientation. If mobile phone 1 is oriented in the predetermined orientation (YES in S142), control unit 11 can set the reception suppression flag (S104). When the operation reception suppression processing shown in FIG. 5 is executed in this way, a tap operation on object 101b may be disabled while scroll target screen 101a is being scrolled.

If mobile phone 1 is not oriented in the predetermined orientation (NO in S142), control unit 11 can refrain from setting the reception suppression flag. When the operation reception suppression processing shown in FIG. 5 is executed in this way, a tap operation on object 101b may be enabled even while scroll target screen 101a is being scrolled.

With such a configuration, a user can select on his/her own whether or not to suppress reception of a tap operation during scrolling.

The predetermined operation is not limited to the above-described operation, but if a proximity sensor is provided for mobile phone 1, for example, an action of bringing a detection object, such as a user's hand, closer to the proximity sensor may be set as the predetermined operation. A predetermined type of touch operation on display 3 may be set as the predetermined operation.

In the above-described embodiment, if the scroll speed when scroll target screen 101a is scrolled is low, a configuration in which a tap operation on object 101b during scrolling is not disabled may be adopted.

Figure 11:
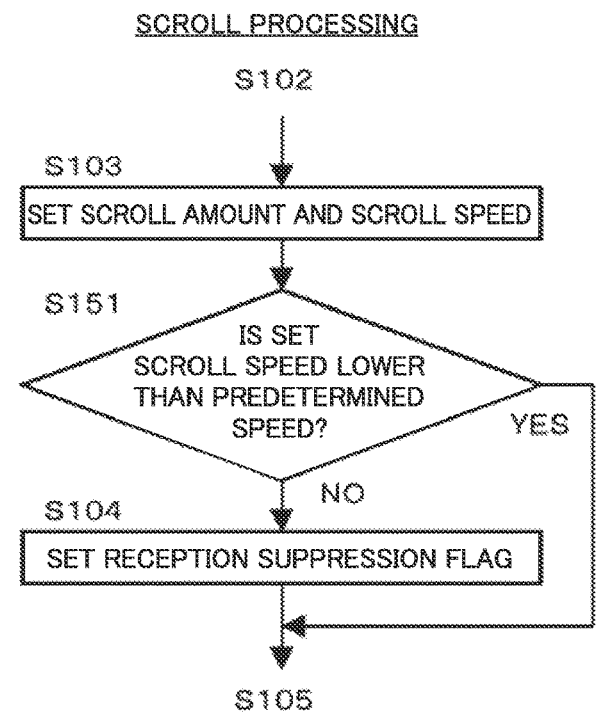
FIG. 11 is a flowchart showing scroll processing according to another variation.

FIG. 11 is a flowchart showing scroll processing according to this variation. In this variation, step S151 is added to the scroll processing shown in FIG. 4. For the sake of convenience, some steps identical to those of the scroll processing shown in FIG. 4 are not shown in FIG. 11.

In step S103, when the scroll amount and the scroll speed are set in accordance with the speed of a flick operation, control unit 11 can determine whether or not the set scroll speed is lower than a predetermined speed (S151).

When the scroll speed is low, it is easier for a user to identify objects 101b included in scroll target screen 101a during scrolling. An accidental tap operation is less likely to be performed on object 101b than when the scroll speed is high.

If the set scroll speed is lower than the predetermined speed (YES in S151), control unit 11 can refrain from setting the reception suppression flag. When the operation reception suppression processing shown in FIG. 5 is executed in this way, a tap operation on object 101b may be enabled even while scroll target screen 101a is being scrolled.

With such a configuration, even while scroll target screen 101a is being scrolled, if the speed thereof is low, a user can perform a tap operation on desired object 101b to thereby cause mobile phone 1 to execute processing assigned to the tap operation.

A target screen to be subjected to execution of the scroll processing, the operation reception suppression processing and the display change processing in an embodiment is not limited to the web screen shown in FIGS. 3A to 3C, but may be any screen. For example, the target screen may be a screen on which an icon for activating an application is included as object 101b to be subjected to a tap operation. The target screen may be a screen on which an icon or a thumbnail for reproducing a music file or an image file is included as object 101b to be subjected to a tap operation.

In the above-described embodiment, the present disclosure is applied to a smartphone type mobile phone. The present disclosure is not limited thereto, but may be applied to other types of mobile phones, such as a bar phone, a flip phone, a slide phone, and the like.

The present disclosure is not limited to mobile phones, but may be applied to various types of electronic devices, such as a personal computer, a PDA (Personal Digital Assistant), a tablet PC, a music player, a navigation system, and a digital book terminal.

In the electronic device according to an aspect, the object may include hyperlinked text or image, an icon for activating an application, or an icon or a thumbnail for reproducing a music file or an image file.

In the electronic device according to an aspect, when the tap operation is disabled, the at least one processor may be configured to cause the object to be displayed in a display style different from when the tap operation is enabled.

In the electronic device according to an aspect, the at least one processor may be configured to disable the tap operation on the object until a predetermined time period has passed after scrolling of the screen is stopped.

In the electronic device according to an aspect, if the number of the objects included in a portion displayed in the display region on the screen is larger than a predetermined number and while the screen is being scrolled, the at least one processor may be configured to disable the tap operation on the object.

In the electronic device according to an aspect, if the number of the objects included in the entire screen is larger than the predetermined number and while the screen is being scrolled, the at least one processor can disable the tap operation on the object.

In addition, various modifications can be made to an embodiment of the present disclosure as appropriate within the scope of a technical idea recited in the claims.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. An electronic device, comprising:
   a touch panel display configured to detect an operation at least including a flick operation and a tap operation;
   a storage unit configured to store a control program; and
   at least one processor configured to execute the control program to execute processing in accordance with the operation, the at least one processor being configured to
   cause a screen displayed on the touch panel display to be scrolled based on the flick operation on a display region included in the touch panel display,
   when the screen is scrolled and the screen includes an object to be subjected to the tap operation, disable the tap operation on the object until the screen has stopped scrolling for a predetermined non-zero time period, and,
   after the screen has stopped scrolling for the predetermined non-zero time period when the tap operation on the object has been disabled, re-enable the tap operation on the object.

2. The electronic device according to claim 1, wherein the object includes hyperlinked text or image, an icon for activating an application, or an icon or a thumbnail for reproducing a music file or an image file.

3. The electronic device according to claim 1, wherein when the tap operation is disabled, the at least one processor is configured to cause the object to be displayed in a display style different from when the tap operation is enabled.

4. An electronic device, comprising:
   a touch panel display configured to detect an operation at least including a flick operation and a tap operation;
   a storage unit configured to store a control program; and
   at least one processor configured to execute the control program to execute processing in accordance with the operation, the at least one processor being configured to
   cause a screen displayed on the touch panel display to be scrolled based on the flick operation on a display region included in the touch panel display,
   when the screen is scrolled and the number of objects, included in a portion displayed in the display region, on the screen is larger than a predetermined number, disable the tap operation on the objects until the screen has stopped scrolling for a predetermined non-zero time period, and,
   after the screen has stopped scrolling for the predetermined non-zero time period when the tap operation on the objects has been disabled, re-enable the tap operation on the objects.

5. An electronic device, comprising:
   a touch panel display configured to detect an operation at least including a flick operation and a tap operation;
   a storage unit configured to store a control program; and
   at least one processor configured to execute the control program to execute processing in accordance with the operation, the at least one processor being configured to
   cause a screen displayed on the touch panel display to be scrolled based on the flick operation on a display region included in the touch panel display,
   when the screen is scrolled and the number of objects, included in the entire screen, is larger than a predetermined number, disable the tap operation on the objects until the screen has stopped scrolling for a predetermined non-zero time period, and,
   after the screen has stopped scrolling for the predetermined non-zero time period when the tap operation on the objects has been disabled, re-enable the tap operation on the objects.

6. A method for controlling an electronic device configured to execute processing in accordance with an operation at least including a flick operation and a tap operation, the method comprising, by at least one processor:
   causing a screen displayed on a touch panel display to be scrolled based on the flick operation on a display region included in the touch panel display;
   when the screen is scrolled and the screen includes an object to be subjected to the tap operation, disabling the tap operation on the object until the screen has stopped scrolling for a predetermined non-zero time period; and,
   after the screen has stopped scrolling for the predetermined non-zero time period when the tap operation on the object has been disabled, re-enable the tap operation on the object.

* * * * *